US010456908B2

(12) United States Patent
Bordegnoni et al.

(10) Patent No.: US 10,456,908 B2
(45) Date of Patent: Oct. 29, 2019

(54) MULTI-AXIAL INDUSTRIAL ROBOT

(71) Applicant: Comau S.p.A., Grugliasco (Turin) (IT)

(72) Inventors: Stefano Bordegnoni, Grugliasco (IT); Francesco Ciniello, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 330 days.

(21) Appl. No.: 15/429,731

(22) Filed: Feb. 10, 2017

(65) Prior Publication Data

US 2017/0239810 A1 Aug. 24, 2017

(30) Foreign Application Priority Data

Feb. 19, 2016 (IT) .......................... 102016000017193

(51) Int. Cl.
| B25J 9/04 | (2006.01) |
| B25J 9/00 | (2006.01) |
| B25J 9/08 | (2006.01) |
| B25J 19/00 | (2006.01) |

(52) U.S. Cl.
CPC ............. B25J 9/042 (2013.01); B25J 9/0009 (2013.01); B25J 9/0018 (2013.01); B25J 9/0027 (2013.01); B25J 9/044 (2013.01); B25J 9/08 (2013.01); B25J 19/0029 (2013.01)

(58) Field of Classification Search
CPC .................................. B25J 9/0009; B25J 9/08
See application file for complete search history.

(56) References Cited

U.S. PATENT DOCUMENTS

| 4,984,959 A | 1/1991 | Kato | |
| 2006/0283851 A1* | 12/2006 | Wissnnan | H02G 3/14 220/3.8 |
| 2011/0100146 A1* | 5/2011 | Feng | B25J 9/044 74/490.03 |
| 2013/0340560 A1* | 12/2013 | Burridge | B25J 17/00 74/490.05 |

FOREIGN PATENT DOCUMENTS

| JP | S62166978 | 7/1987 |
| JP | H01146676 A | 6/1989 |
| JP | H01183384 A | 7/1989 |
| JP | H06262555 A | 9/1994 |
| JP | 2001113478 A | 4/2001 |
| JP | 2010058180 | 3/2010 |
| JP | 2010158753 A | 7/2010 |

\* cited by examiner

*Primary Examiner* — Ronald P Jarrett
(74) *Attorney, Agent, or Firm* — Young Basile Hanlon & MacFarlane, P.C.

(57) ABSTRACT

Described herein is a multi-axial industrial robot, in particular of a SCARA type, where the base structure designed to enable installation of the robot on an external supporting structure, can be mounted according to two opposite orientations, where one orientation is upside down with respect to the other, while at the same time the operating head of the robot may instead maintain one and the same orientation.

16 Claims, 12 Drawing Sheets

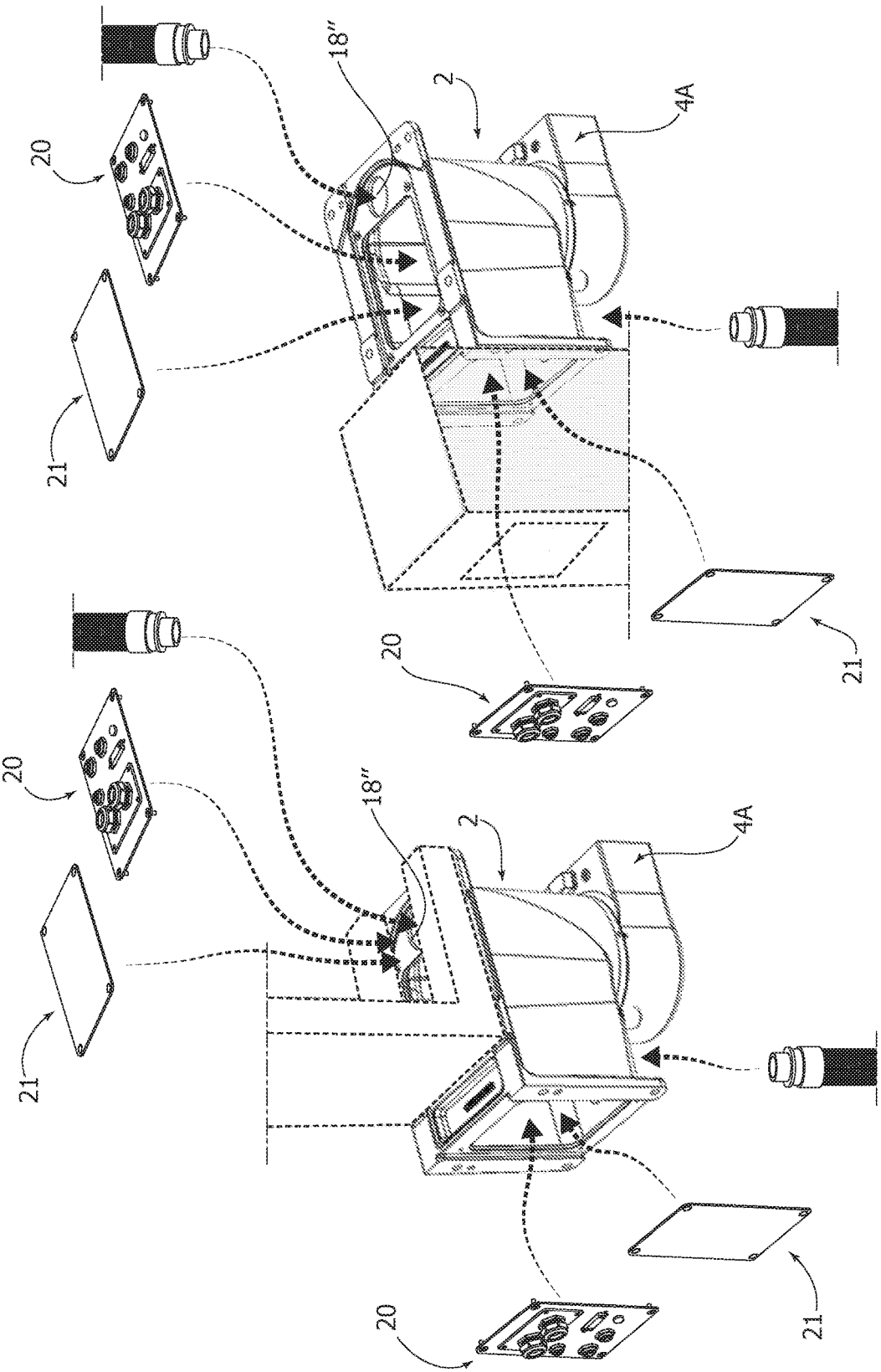

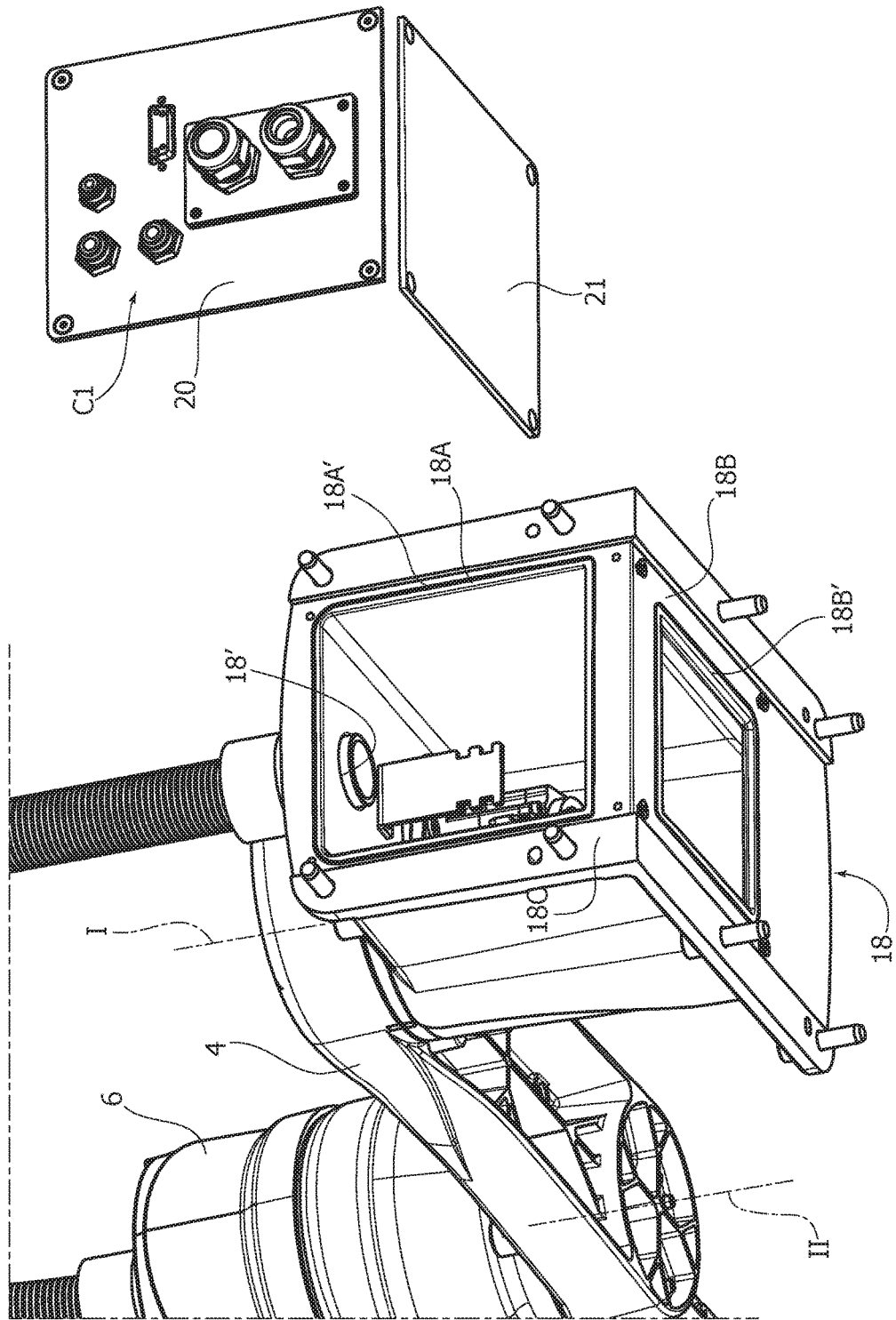

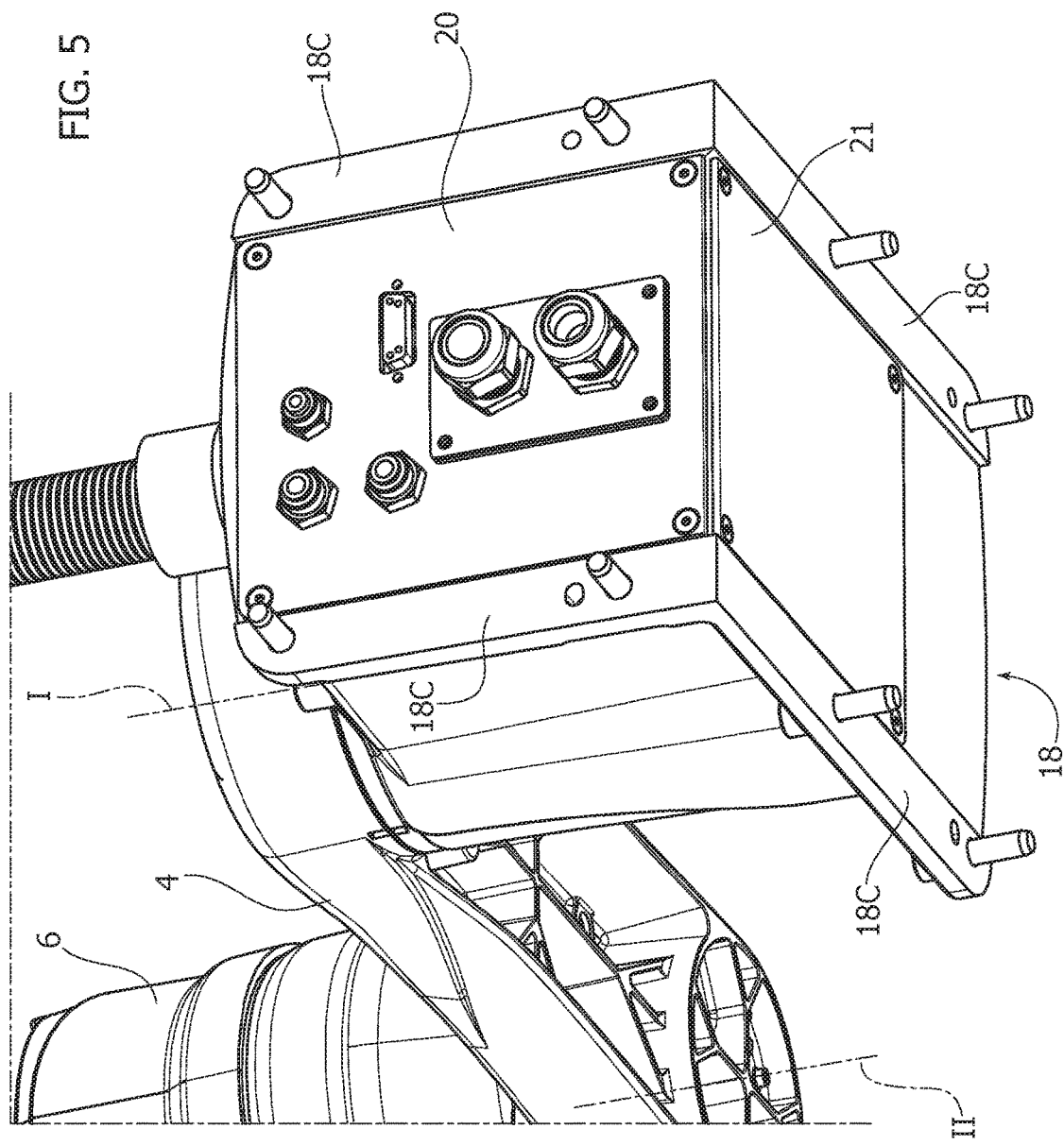

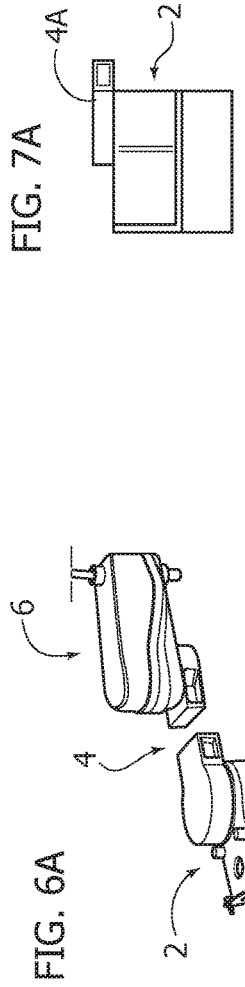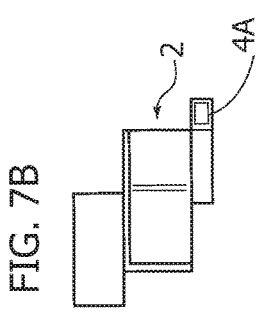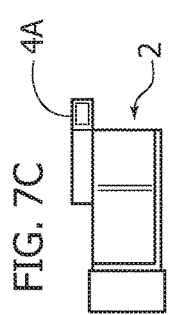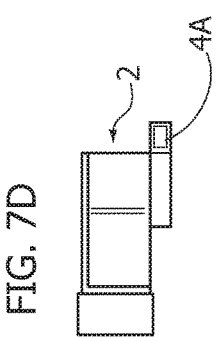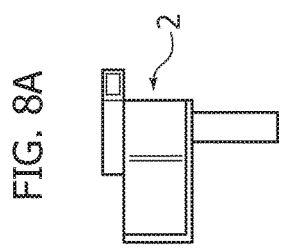

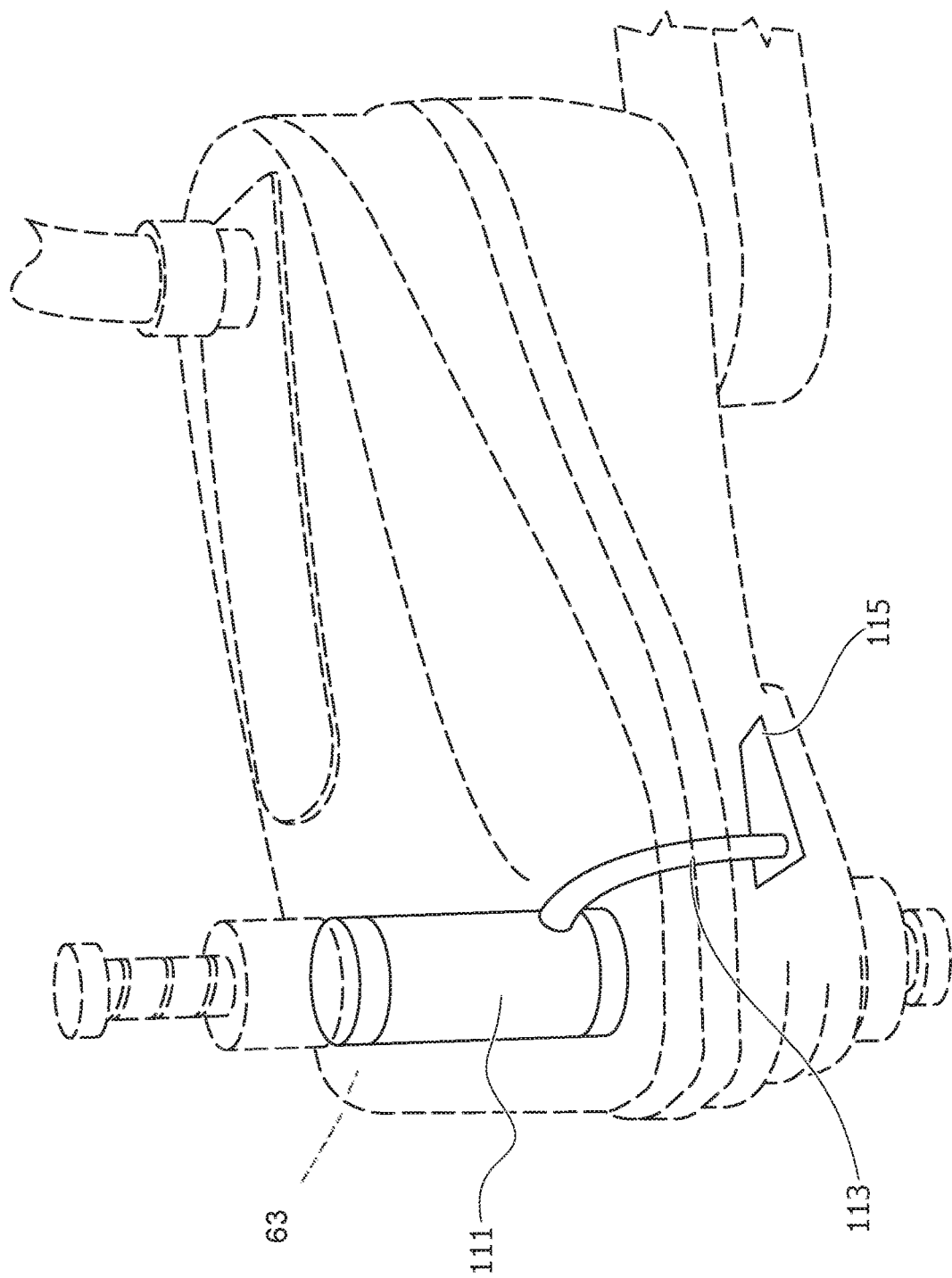

MULTI-AXIAL INDUSTRIAL ROBOT

TECHNICAL FIELD

The present invention relates to a multi-axial industrial robot, in particular of a SCARA type.

BACKGROUND

In general, a SCARA robot comprises:
a base structure;
a first arm pivotally connected to the base structure about a first axis of rotation;
a second arm pivotally connected to said first arm about a second axis of rotation parallel to the first axis; and
an operating unit carried by a shaft which is mounted on the second arm and can be driven, by means of a driving assembly, in a first movement of translation along a third axis and in a second movement of rotation about said third axis, said third axis being parallel to the aforesaid first and second axes.

In the field of industrial automation, multi-axial robots of a SCARA type are becoming extremely widespread in various production fields thanks to their relatively simple structure, their compactness, and their versatility, which renders them easily adaptable for carrying out new and different operations.

In the light of this increasingly widespread use, there is felt the need for operators in the field of industrial automation to be able to offer a range of solutions for this type of robots that is as broad as possible in order to satisfy all the specific requirements of the various applications.

In this connection, the document JP2010-158753 proposes a SCARA robot equipped with an arm that is characterized in that it has a modular structure so as to be able to assume different lengths. This solution hence enables use of one and the same robot for different applications for which the range of action of the robot changes, simply by setting the arm of the robot to the length suitable for the required range of action.

SUMMARY

In the above context, the object of the present invention is to provide a multi-axial robot of a SCARA type that will be improved in terms of versatility and ease of installation and use.

In particular, the present invention provides a multi-axial robot of a SCARA type that will present one or more of the following advantages:
the possibility of enabling installation of the robot in the two modes, namely, the so-called floor-mounted and ceiling-mounted modes;
the possibility of varying the overall length of the robot;
the possibility of varying the arrangement of the connectors on the base structure of the robot; and
the possibility of varying exit from the base structure of the bundle of the connection equipment that connects the base structure to the second arm of the robot.

One or more of the objects referred to above is achieved via a robot having the characteristics of claim 1.

The claims form an integral part of the technical teaching provided herein in relation to the invention.

BRIEF DESCRIPTION OF THE DRAWINGS

Further characteristics and advantages of the invention will emerge clearly from the ensuing description with reference to the annexed drawings, which are provided purely by way of non-limiting example and in which:

FIG. 3A illustrates one example of installation of the robot of FIG. 1 mounted to an external support structure (shown in dashed lines);
FIG. 3B illustrates an alternate example of installation of the robot of FIG. 1 mounted to an external support structure (shown in dashed lines);
FIG. 4 illustrates a detail of the base structure of the robot of FIG. 1 in exploded view;
FIG. 5 illustrates the detail of FIG. 4 in the assembled state;
FIG. 6A is a schematic illustration of one example of assembly of the robot of FIG. 1;
FIG. 6B is a schematic illustration of an alternate example of assembly of the robot of FIG. 1;
FIG. 6C is a schematic illustration of an alternate example of assembly of the robot of FIG. 1;
FIG. 7A is a schematic illustration of one example of installation of the base structure of the robot of FIG. 1;
FIG. 7B is a schematic illustration of an alternate example of installation of the base structure of the robot of FIG. 1;
FIG. 7C is a schematic illustration of an alternate example of installation of the base structure of the robot of FIG. 1;
FIG. 7D is a schematic illustration of an alternate example of installation of the base structure of the robot of FIG. 1;
FIG. 8A illustrates one example positioning of the connectors of the base structure of the robot of FIG. 1;
FIG. 8B illustrates an alternate example of positioning of the connectors of the base structure of the robot of FIG. 1;
FIG. 14 is a perspective view of a further detail of the distal arm of the robot of FIG. 1.

DETAILED DESCRIPTION

Figure 1:
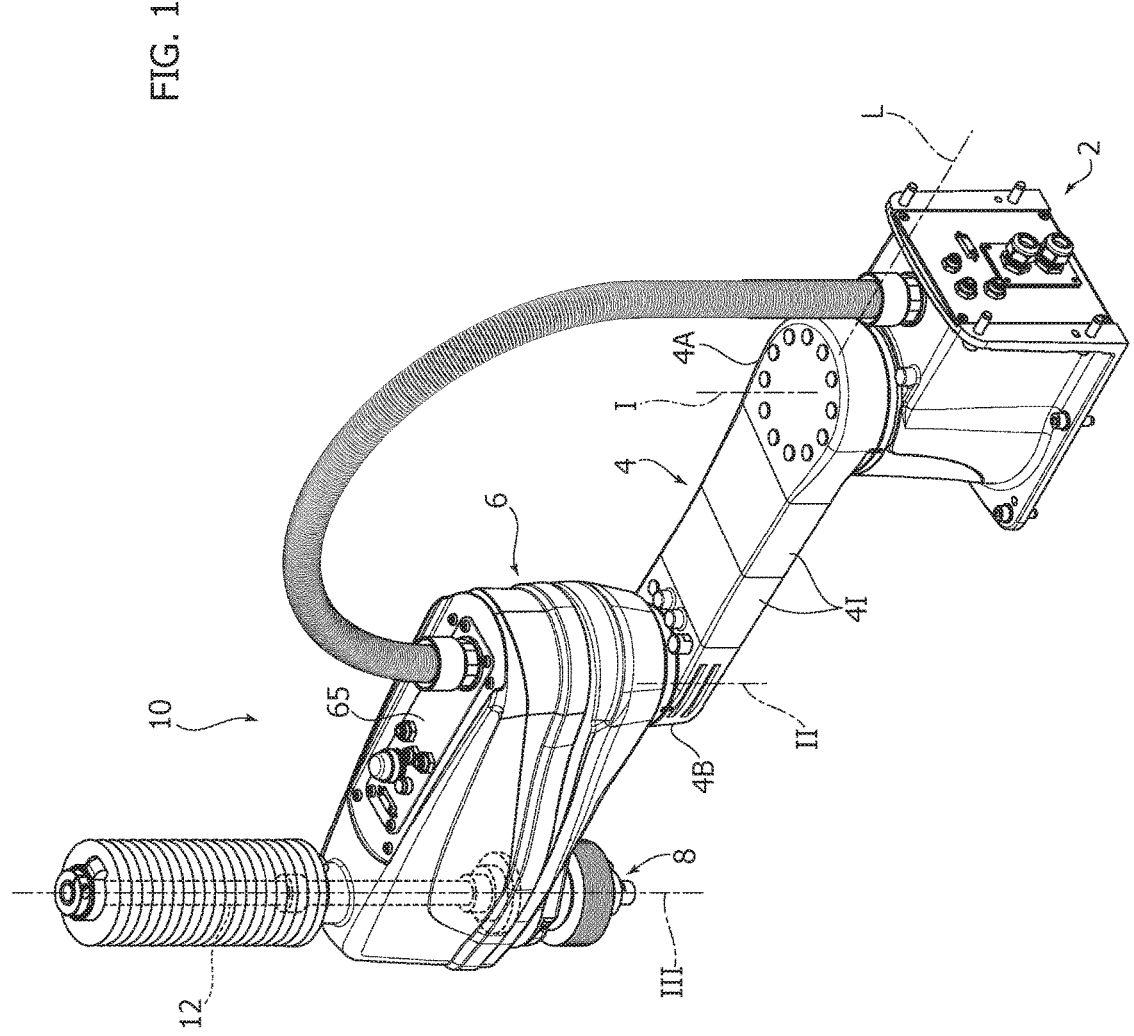
FIG. 1 is a perspective view of an embodiment of the robot described herein.

In the ensuing description, various specific details are illustrated aimed at enabling an in-depth understanding of the embodiments. The embodiments may be provided without one or more of the specific details, or with other methods, components, or materials, etc. In other cases, known structures materials, or operations are not shown or described in detail so that various aspects of the embodiment will not be obscured.

The references used herein are only provided for convenience and hence do not define the sphere of protection or the scope of the embodiments.

As indicated above, the present invention relates to a multi-axial industrial robot, in particular a SCARA robot.

In general, the robot described herein—designated, as a whole, in the figures, by the reference number 10—comprises:
a base structure 2;
a first arm 4 pivotally connected to the base structure 2 about a first axis of rotation I;

a second arm 6 pivotally connected to the first arm about a second axis of rotation II parallel to the aforesaid first axis; and an operating unit 8, which is carried by a shaft 12 mounted on the second arm 6 and can be driven, by means of a driving assembly, in a first movement of translation along a third axis III and in a second movement of rotation about the same third axis.

The third axis is parallel to both of the axes, i.e., the first and second axes, indicated above.

In the robot described herein, the first arm 4 has a modular structure, which can be assembled in a wide range of ways and is constituted by a series of elements 4I. This series comprises, in particular (see FIGS. 1, 2, and 6):

a base element 4A configured for being pivotally mounted on the base structure 2;

a distal element 4B designed to receive, pivotally mounted on itself, the second arm 6; and one or more intermediate elements 4I configured so that they can be mounted indifferently on the other elements 4I, on the base element 4A, and/or on the distal element 4B.

In various preferred embodiments, as in the one illustrated, the intermediate elements 4I are constituted by blocks of a generic parallelepipedal shape, each of which defines two opposite faces 41 and 42, a front side 43, a rear side 44, and opposite lateral sides 45. On the front and rear sides 43, 44 parts 101 are provided for connection of the element to the other elements of the series, which may, for example, have holes (as in the embodiment illustrated), slits, pins, studs, etc.

The base and distal elements 4A, 4B are, instead, constituted by bodies that define a respective first portion 410 or 420 for mounting, respectively, on the base structure 2 or on the second arm 6, and a respective second portion 412 or 422 for connection to the elements 4I or else, directly, to the distal element 4B or to the base element 4A, respectively. These portions 412 and 422 have, in particular, a respective end side 413, 423 equipped with parts 101 for connection with the other elements of the series, which may envisage— as in the case of the sides 43 and 44 of the elements 4I—holes (as in the embodiment illustrated), slits, pins, studs, etc.

It should now be noted that the respective connection parts of the various elements of the series are configured in such a way that the front and rear sides 43 and 44 of the elements 4I can be connected to any of the other elements 4I or else to the base element 4A, or again to the distal element 4B. Likewise, the distal sides 413 and 423 of the elements 4A and 4B can be connected to any of the elements 4I or else directly to the other end element of the series, i.e., respectively, to the element 4B and to the element 4A.

In the embodiment illustrated, fixing between the various elements of the series is obtained with the aid of screws or bolts 103 that engage the corresponding holes provided in the connection parts described above. These auxiliary fixing means may also be of some other type and may on the other hand not be necessary in the case where the connection parts of the various elements are equipped with slotting means, for example pins and holes.

According to the length required by the specific applications, the first arm 4 may be made up of a given combination of the aforesaid elements. In this connection, FIGS. 6A, 6B and 6C illustrate the three different examples of possible configurations of the arm in question in the case where its overall structure comprises the two elements 4A and 4B and two intermediate elements 4I. As illustrated in this figure, in the configuration of shorted length in FIG. 6A, the arm 4 is constituted only by the two elements 4A and 4B.

It should be noted that the robot described herein can be sold with the entire set of elements 4I, and it will be the user who, at the moment of installation of the robot, will decide the configuration to be adopted for the arm in question according to the required application.

With reference now to the base structure 2 (see FIGS. 4 and 5), it normally has the dual function of pre-arranging the means for fixing the robot to the external structure that will support it in the installed condition, and of carrying the connectors for connection of the equipment of the robot (i.e., power-supply cables of the motors, air-supply pipes, etc.) to external supply sources. The base structure 2 normally contains, moreover, the motor for actuating the first arm 4.

In a way in itself known, the base structure 2 has (see FIGS. 4 and 5) a main body 18, obtained by moulding of molten metal material, which defines inside it a cavity, housed within which are the aforesaid motor for driving the first arm and the terminal portions of the equipment of the robot. The structure 2 further comprises a plate 20, which closes the cavity of the body 18 with respect to the outside environment and carried on which are different connectors and/or ports C1—which may be not only of an electrical type, but also, for example, of a pneumatic type—connected to which are the aforesaid terminal portions of the equipment. The equipment referred to, constituted by a bundle of cables and/or pipes, comes out of the base structure 2 through an opening 18' made in the top wall of the structure and connects directly to the top shell of the second arm.

In the base structure of the robot described herein, the body 18 has a first wall 18A and a second wall 18B, which are transverse with respect to one another, on which the inner cavity of the body defines respective openings 18A', 18B'; as will be seen in what follows, the first wall 18A is designed to constitute a rear wall of the base structure 2, whereas the second wall 18B is designed to constitute alternatively a bottom wall or a top wall of the structure according to the mode in the structure is installed. The plate 20 with its different connectors and/or ports C is configured for being associated indifferently to one or other of the two walls 18A and 18B, totally covering the corresponding opening.

The characteristics indicated above afford the advantage of enabling two different examples of modes of connection of the equipment of the robot to the external supply sources, which are schematically represented in FIGS. 8 A and 8B: namely, the connection in question may be provided indifferently either on the underside of the base structure (see FIG. 8), where the plate 20 is mounted on the bottom wall 18B of the body 18, or on the rear side, where the plate 20 is instead mounted against the rear wall 18A.

In various embodiments, as in the one illustrated, the base structure 2 moreover comprises a further plate 21 which, like the plate 20, can be associated to both of the two walls 18A and 18B and has only the function of covering the corresponding openings of these walls. In alternative embodiments, also the plate 21 has, instead, one or more connectors for connection of the equipment of the robot to the external supply sources.

The plates 20, 21 can be connected to the body 18 preferably via screws or bolts that engage corresponding holes made in the plate and in the body; in any case, it is possible to envisage even modalities of connection of some other type, for example via slotting, gluing, etc. In this regard, it should be noted that the connection may be either of a temporary type, so as to enable variation of the arrangement of the plates even subsequently, for example at the moment of a new installation of the robot for a new use thereof, or of a permanent type—at least for the plate 21—so that the arrangement chosen at the moment of manufacture of the robot will remain fixed and not modifiable.

Once again with reference to the base structure, in various embodiments, as in the one illustrated, the body 18 has a pair of flanges 18C immediately adjacent to, and at the opposite sides of, each of the two walls 18A and 18B, which are pre-arranged for mounting and fixing of the structure 2 to an external supporting structure. In particular, the flanges 18C have a series of holes pre-arranged for fixing via screws or bolts.

In various preferred embodiments, as in the one illustrated, the walls 18A and 18B are lowered with respect to the adjacent flanges 18C so as to identify, between these flanges, corresponding seats pre-arranged for receiving indifferently each of the two plates 20, 21 and for receiving these plates in a condition where they remain within the front space occupied by the two flanges or in any case flush therewith.

The base structure 2 of the robot described herein can be mounted and fixed to an external supporting structure either via the flanges 18C adjacent to the wall 18B or, alternatively, via the flanges 18C adjacent to the wall 18A. For this purpose, the flanges 18C and in general the body 18 can, in fact, be appropriately sized so that even just one of the two pairs of flanges will alone be able to withstand the weight of the entire robot. In this regard, as has been seen above, the body 18 is preferably made of a metal material, for example a magnesium alloy.

FIGS. 7A, 7B, 7C and 7D illustrate examples of different possible modes of installation of the base structure 2.

As may be seen in this figure, the base structure 2 can be mounted, via the flanges 18C adjacent to the second wall 18B, according to two different modes of installation, a first, so-called floor-mounted, mode where the second wall 18B and the flanges 18C face downwards (mode A,FIG. 7A) and the flanges are fixed to a floor structure, for example a base, and a second, so-called ceiling-mounted, mode where the walls 18B and the flanges 18C instead face upwards (mode B, FIG. 7B) and these flanges are fixed to an overhead structure.

On the other hand, the base structure 2 can be mounted, via the flanges 18C adjacent to the first wall 18A, to an external structure that is more or less vertical, also in this case according to two opposite orientations, a first one where the wall 18B and the flanges 18C face downwards (mode C, FIG. 7C), and a second one where they face upwards (mode D, FIG. 7D).

In mode B—the ceiling-mounted mode—and mode D, the base structure 2 is in a condition where it is set upside down with respect to the condition assumed in the other two modes A and C. This means that also the shaft of the motor that controls the axis I faces downwards and that, if the rest of the robot is kept in its normal configuration, the second arm and its operating head would also be set in a condition set upside down in which the operating head 8 faces upwards instead of downwards.

However, also in the modes B and D indicated it is desirable for the second arm to remain in the conventional orientation, this being the most suitable one for proper operation of the robot.

In the robot described herein, the above problem is solved thanks to the first arm 4, which is in fact pre-arranged in such a way that at least one of its elements can be mounted in two different orientations with respect to the base structure 2 and/or to the second arm 6, where one orientation is upside down with respect to the other, this making it possible to maintain the operating head 8 in its normal condition facing downwards even when the base structure 2 is mounted upside down.

In particular, in various preferred embodiments, as in the one illustrated, at least one element of the series that makes up the arm 4, can be mounted with respect to the element of the series that follows it according to an orientation about a longitudinal axis L of the arm (illustrated in FIG. 1) that selectively envisages a first condition in which this element and the next one have one and the same orientation and a second condition in which this element is substantially turned upside down with respect to the next element.

Figure 2:
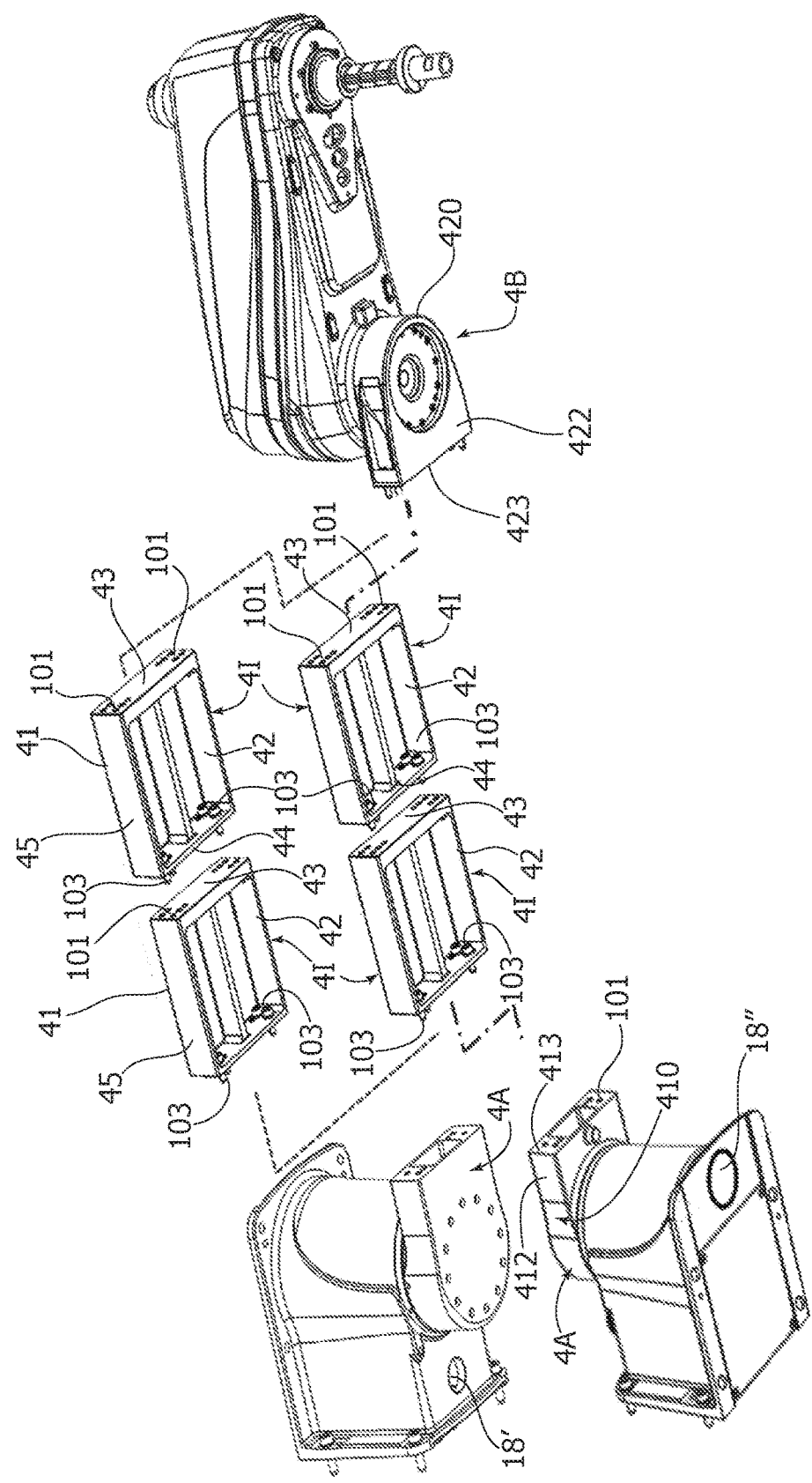
FIG. 2 is an exploded view of the robot of FIG. 1.

For a better understanding reference may now be made to FIG. 2, which illustrates the orientation assumed by the different parts of the robot respectively in the floor-mounted installation mode (mode A,FIG. 7A)—bottom part of the figure—and in the ceiling-mounted installation mode (mode B,FIG. 7B)—top part of the figure. The base structure clearly faces upwards in the first installation mode, and is set upside down, hence set facing downwards, in the second mode. The second arm 6 remains instead—as desired—with the same orientation in both of the two installation modes. With reference now to the first arm 4, it should be noted that the distal element 4B and the intermediate elements 4I also maintain one and the same orientation, as in the case of the second arm 6, whereas the base element 4A assumes, in the second, ceiling-mounted, mode, a position set upside down, as in the case of the base structure 2, and in this position set upside down it connects up to the intermediate element 4I.

In the light of what has been said above, it is hence thanks to the possibility of connecting together the base element 4A and the intermediate element 4I in one or other condition that it is possible to pre-arrange the base structure 2 in either of the two, floor-mounted and ceiling-mounted, installation modes, while at the same time maintaining, instead, the second arm in the same orientation as the one illustrated.

Once again with reference to FIG. 2, it may be understood that the same result can be obtained by envisaging the possibility referred to of varying the orientation with respect to the next element for any other element of the series in addition to the base element 4A. In effect, it is preferable for this possibility to be envisaged for all the elements of the series in order to offer the maximum freedom of modification of the configuration of the robot so as to adapt it in the best possible way to the conditions envisaged in the various applications.

In various alternative embodiments, the above dual possibility of orientation may, instead, regard the base element 4A and the base structure 2, or else the distal element 4B and the second arm 6; i.e., in other words, the base element 4A or else the distal element 4B may be configured so that they can be connected to the base structure 2 or to the second arm 6, in two different orientations, one upside down with respect to the other, according to the installation mode envisaged. In this case, the various elements that make up the first arm 4 all maintain one and the same mutual orientation, and it is, instead, the base element 4A or the distal element 4B that changes the face with which it is connected, respectively, to the base structure or to the second arm. In a first case, in the passage from mode A to mode B of FIGS. 7A and 7B, the arm 4 can be turned upside down together with the base structure 2 and the second arm 6 can be connected to the new face that faces upwards of the first arm 4. In a second case, in the passage from mode A to mode B, the arm 4 can instead maintain the same orientation as the second arm, and the base structure 2 turned upside down is hence connected to the arm 4 at the face of the latter that faces upwards.

To be able to provide this alternative embodiment, the base element 4A and the distal element 4B must clearly present, on both of their opposite faces (the bottom one and the top one, or vice versa, according to the installation mode), portions configured for enabling mounting of a pivoted type of the element to the base structure 2 or to the second arm 6.

In relation to the condition where the base structure 2 is set upside down, it should be noted that this structure may have a second opening 18" (FIGS. 3A and 3B), provided on the second wall 18B, through which the connection equipment of the robot can be made to come out, upwards, instead of the opening 18' provided on the opposite wall of the body 18, through which (in the overturned condition) the connection equipment would come out, instead, downwards. The use of one or other of the two openings in question may depend upon the specific requirements of space and/or the limits of overall dimensions in the various applications. For example, in the case where underneath the robot external structures are present in which the bundle of the connection equipment might get caught up, the choice will be to get the bundle to come out directly upwards through the second opening 18", whereas, in the case where there is little space available above the robot, the choice will, instead, be to get it to come out downwards through the opening 18'.

Once again as illustrated in FIGS. 3A and 3B, and as already described with reference to FIG. 8, for each of the installation modes envisaged for the base structure 2, the plate 20 with the connectors C may be mounted on the second wall 18B or else on the first wall 18A of the base structure according to the configuration or architecture of the operating area that is to receive the robot (FIG. 3A showing alternate mounting options of the plates 20 and 21 depending on the installation mode).

Figure 9:
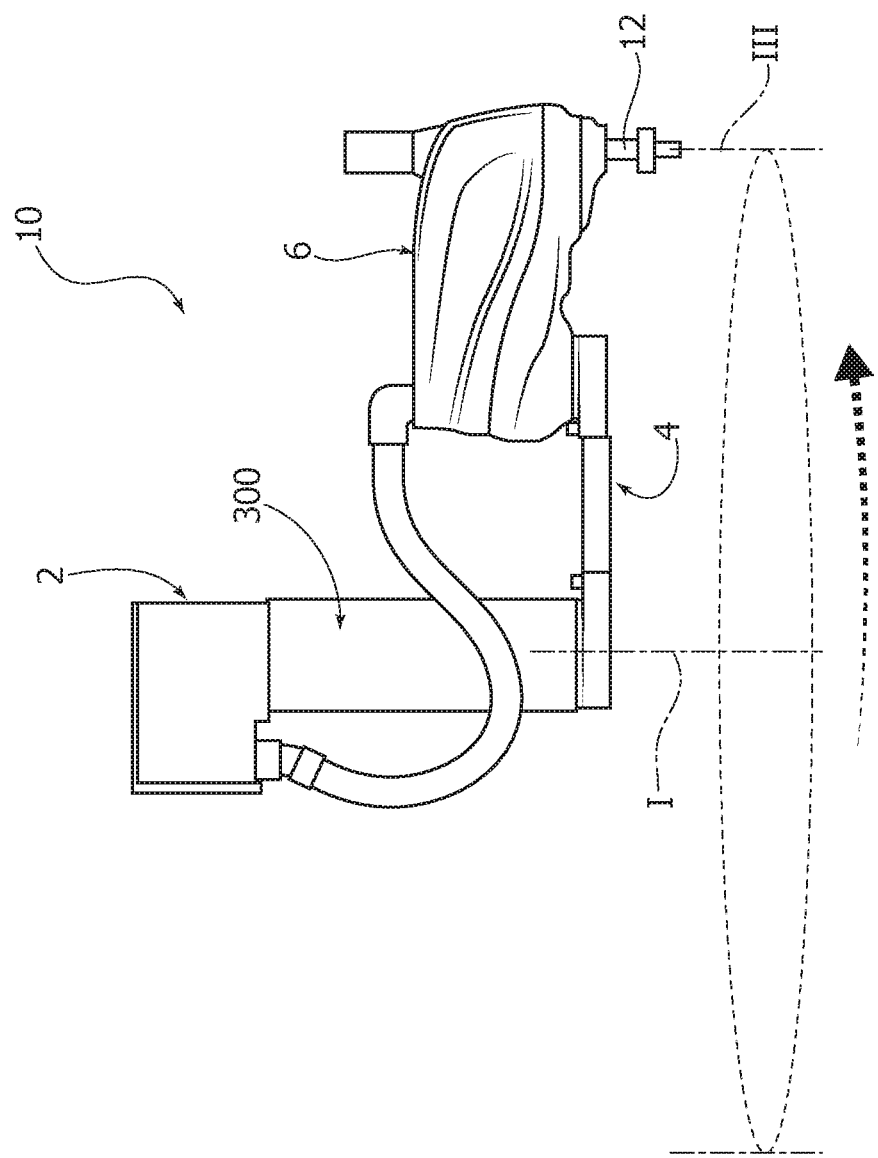
FIG. 9 illustrates a further condition of installation of the robot of FIG. 1.
Figure 10:
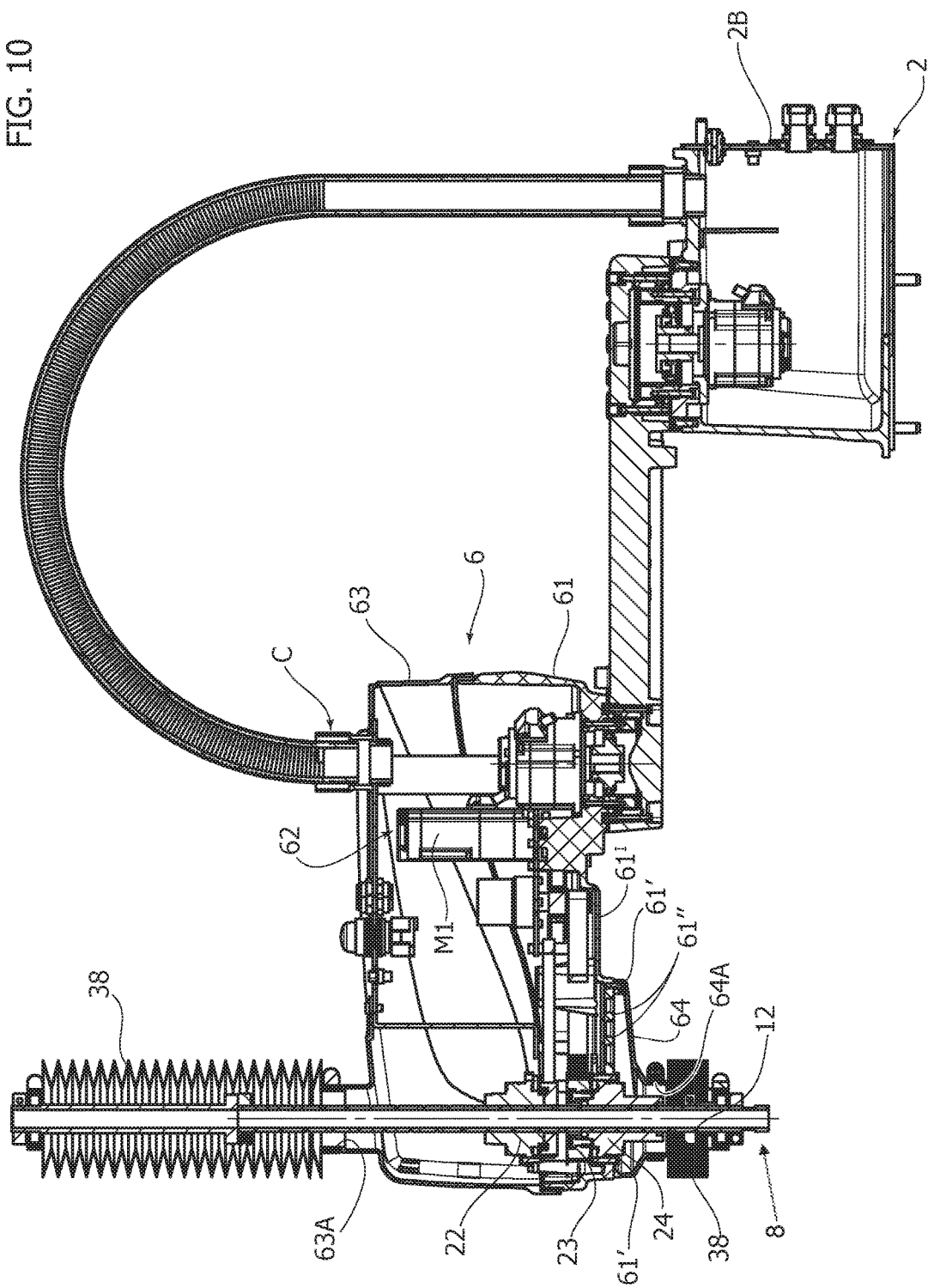
FIG. 10 is a partial cross-sectional view of the robot of FIG. 1.
Figure 11:
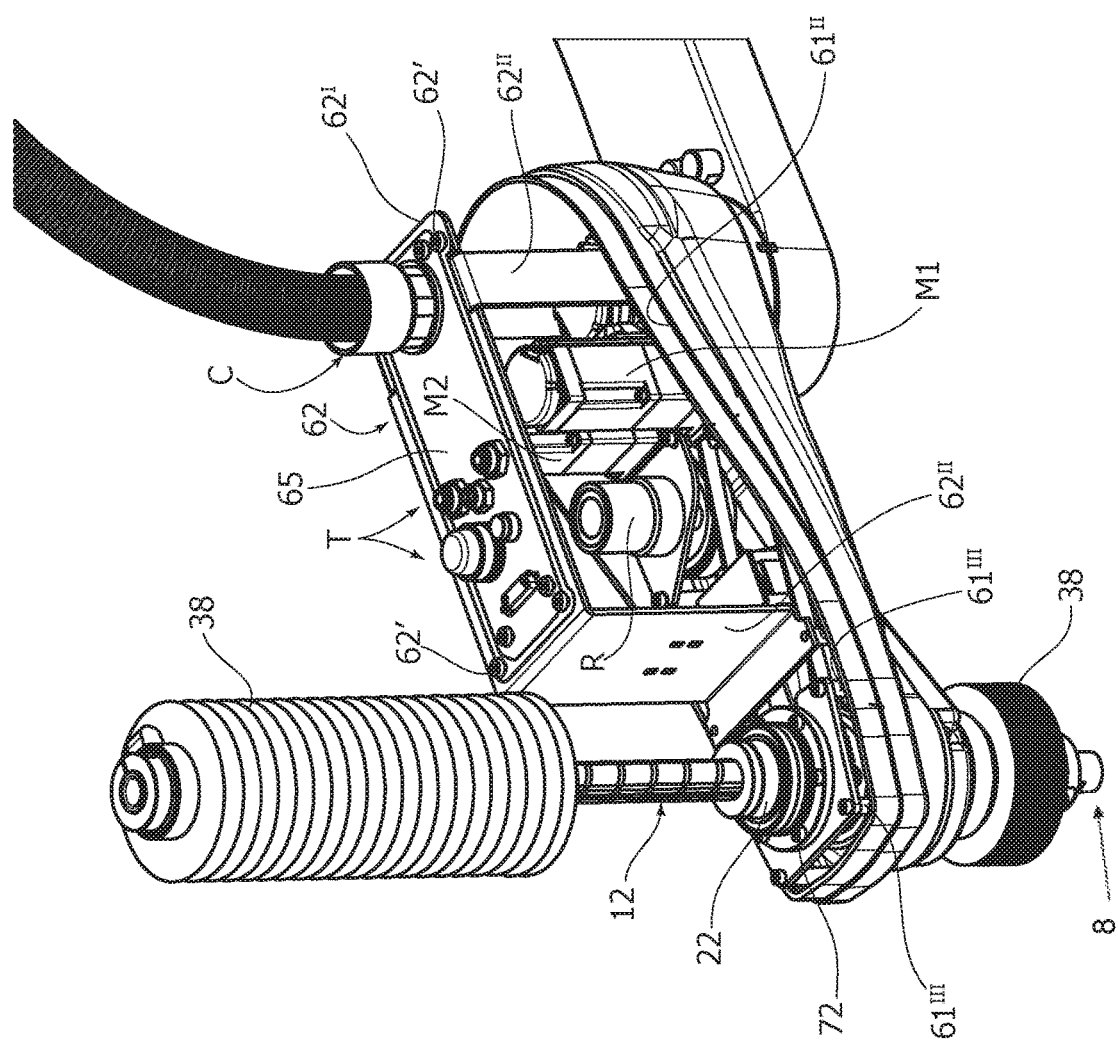
FIG. 11 illustrates a view of a detail of the distal arm of the robot of FIG. 1, in which the covering body of said arm has been removed.
Figure 12:
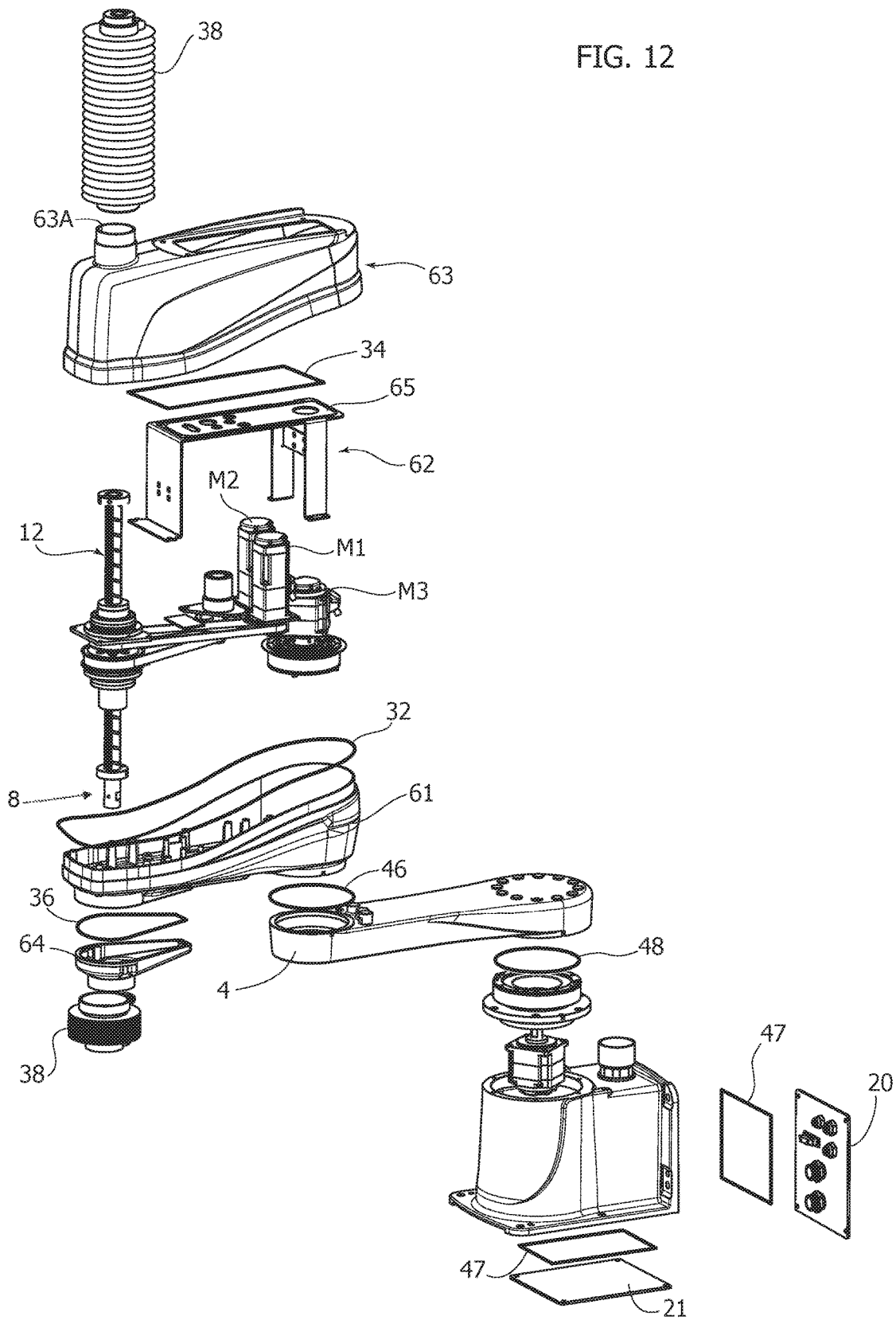
FIG. 12 is an exploded view of the robot of FIG. 1.
Figure 13:
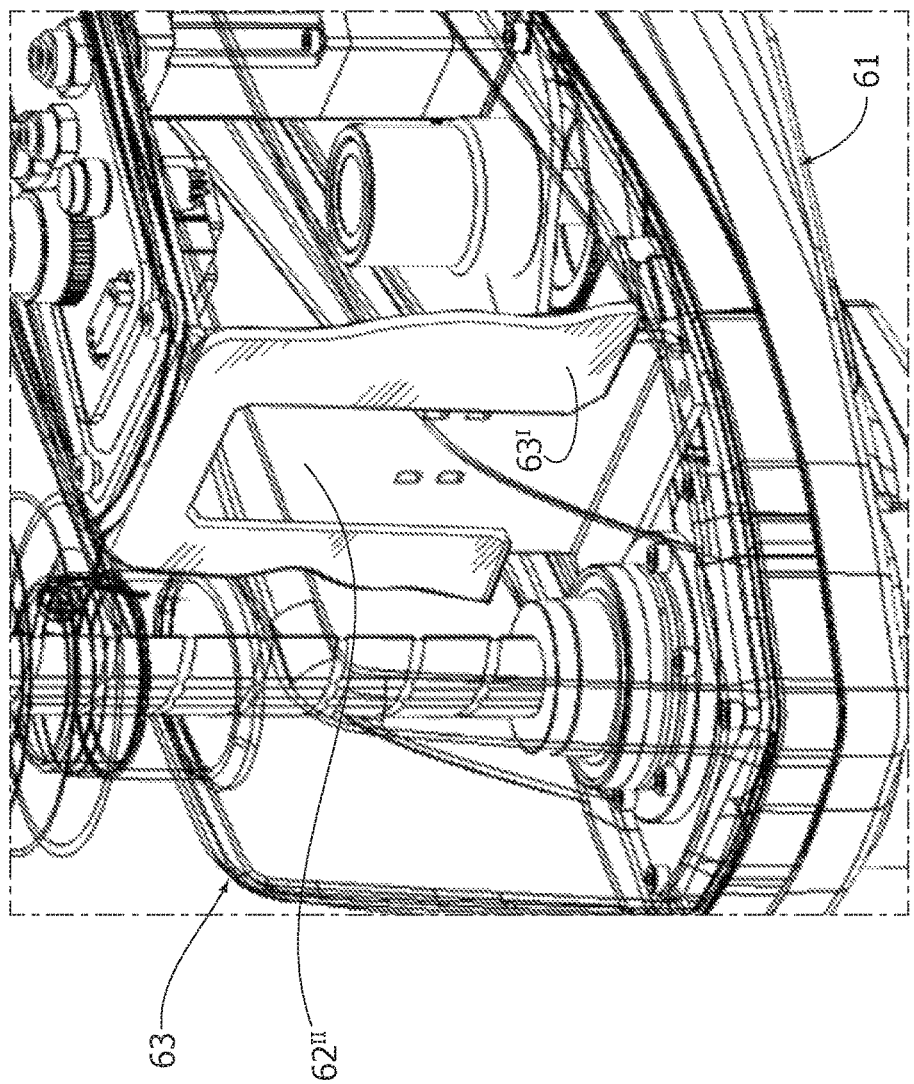
FIG. 13 is a perspective view of a detail of the distal arm of the robot of FIG. 1.

Finally, with reference to FIG. 9, the robot described herein may moreover envisage a spacer body 300 that is to be set between the first arm 4 and the base structure 2, which is designed, in particular, to be used in a ceiling-mounted installation mode and has the function of setting vertically apart the second arm 6 from the overhead supporting structure in order, for example, to enable the head 8 to operate on an underlying area, which otherwise could not be reached, or else in order to obtain underneath the supporting structure a space sufficient for the head 8 to operate.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims. In particular, it should be noted that, in the foregoing description, reference has been made to embodiments in which the structure 2 can be set in two orientations turned upside down with respect to one another, facing respectively upwards and downwards. In general, the teachings provided above apply, however, in the same way for any arrangement of the base structure according to two distinct orientations, which can be defined with respect to one another as the result of a rotation of the structure itself through an angle of approximately 180°, about an axis transverse to the axes I, II, and III. According to the specific architecture of the robot, the rotation in question may, on the other hand, even depart significantly from the value of 180°.

It should once more be noted that, in an embodiment alternative to the one illustrated, instead of providing the further plate 21 described above, the same plate 20 can present two distinct portions oriented orthogonally with respect to one another, which can be used in the same way as the two plates 20 and 21 described above.

With reference now to the second arm 6 (see FIGS. 10 to 14), it comprises a base body 61, fixed on which is the driving assembly referred to, and a covering body 63, which is mounted on the base body and is designed to constitute, together with the base body, a casing enclosed within which is the driving assembly. In various embodiments, as in the one illustrated, the second arm 6 contains inside it also the motor for it to be driven in rotation about the second axis II (designated in the figures by the reference M3), which is mounted on the base body 61 in a conventional way.

In the robot described herein, the second arm 6 in question further comprises an intermediate body 62 via which the covering body 63 can be fixed to the base body without any need to provide a direct fixing between these two bodies. In particular, the intermediate body 62 is pre-arranged for being fixed on the base body and has a structure that is configured for being set at least in part between the covering body and the driving assembly and that is equipped with portions for fixing of the covering body to the intermediate body itself.

The characteristics referred to afford the advantage of providing a coupling between the base body and the covering body that is constructionally simpler as compared to known solutions and that at the same time is characterized in that it facilitates provision of a hermetic closing of the casing of the arm. In particular, these characteristics make it possible to provide an arm having a degree of protection—also referred to as IP degree, which is defined by the current CEI standard UNI EN60529—that is higher than that of robots of the same type currently available on the market. As may seen in detail in what follows, preferably the two bodies in question both have a generic half-shell conformation and are coupled together at their respective perimetral edges.

In various embodiments, as in the one illustrated, the base body 61 has a bottom wall 61I provided on which is an opening 61' through which the shaft 12 passes. Moreover provided on the bottom 61I is an array of supporting formations 61III on which at least part of the driving assembly of the shaft 12 and the intermediate body 62 indicated above will be fixed.

The driving assembly has, in particular, two electric motors M1, M2 and a transmission member R, each mounted on a respective plate that is fixed via screws to corresponding supporting formations 61III of the bottom 61I. In various preferred embodiments, these formations are constituted by pins provided with internal threaded holes within which the screws for fixing the plates indicated above will be screwed.

The driving assembly further comprises a first pulley (not illustrated) connected via a belt to the motor M1 and associated to a screw member 22 for transmission of motion that engages a corresponding threaded surface provided on the shaft 12. This member 22 is supported, via interposition of bearing means, to a plate 72, which is also fixed via screws to corresponding formations 61III of the base body.

The driving assembly in question further comprises a second pulley 23, which is connected via a drive belt to the motor M2 through the transmission member R and is associated to a member 24 for transmission of the motion of rotation of the pulley 23 to the shaft 12. The member 24 engages the opening 61' provided on the bottom 61I and is fixed to this via screws or bolts. An end cover 64 shaped like a half-shell is fixed to the bottom 61I and closes the member with respect to the outside environment. The end cover 64 has a bottom opening 64A through which the shaft 12 passes. It should be noted that the arrangement of the members 22 and 24 may, however, also be reversed.

In various embodiments, as in the one illustrated, the intermediate body 62 is constituted by a metal sheet cut and bent so as to define a raised wall 62I, which is located over the electric motors M1, M2, M3 and the transmission members R, and a series of flaps 62II bent substantially at 90° with respect to the aforesaid wall, which are fixed to respective formations 61III of the bottom 61I. As will be seen in what follows, the front flap 62II that is set facing the shaft 12 may constitute a wall for separation of the inside of the covering body 63.

In various embodiments, as in the one illustrated, the raised portion 62I has a frame configuration defining an internal opening (not visible in the figures). Fixed thereon, via connection means of a removable type, for example, screws, is a wall or plate 65 positioned on which are appropriate elements T for control of the robot and/or of the tool connected thereto (such as warning lights, pushbuttons, connectors, etc.), and a connector C for connection of the equipment of the robot to the arm 6 described herein. The equipment extends in the form of a bundle of pipes and/or electrical cables that connects the base structure 2 to the arm 6. The opening mentioned above of the portion 62I enables the elements T to face and have access to the inside of the arm 6.

The raised portion 62I moreover has appropriate holes 62' positioned so as to mate with corresponding holes 63' provided in the top wall of the covering body 63 to enable mutual fixing via screws of the aforesaid body to the intermediate body 62. In various preferred embodiments, as in the one illustrated, the covering body 63 has a top opening 63" designed to set itself on the raised portion 62I and on the wall 65 carried thereby, so as to enable the series of warning lights, keys, and connectors indicated above to emerge on the outside; the wall 65 remains totally within the aforesaid top opening of the body 63. In a way in itself known, the body 63 then moreover has a top opening 63A through which the shaft 12 passes.

It should be noted that in alternative embodiments, the wall 65 may be made of a single piece with the intermediate body 62, and in the this case this body is constituted by a sheet metal plate cut and bent so as to define directly the wall 65 instead of the raised portion 62I described above. However, the embodiment in which the wall 65 constitutes an element distinct from the intermediate body 62 affords the advantage that it is possible to take apart the wall and gain access to the inside of the covering body 63 without any need to remove the latter from the base body.

As anticipated above, in various preferred embodiments, as in the one illustrated, in the robot described herein the casing of the arm 6 is hermetically closed both in order to prevent exit of contaminating material in the operating area and so that it can be used in applications in which the arm, or the robot in general, may also be exposed to the presence of liquids.

To obtain hermetic tightness of the arm, an annular gasket 32 is set between the respective mouth edges mutually coupled of the covering body 63 and of the base body 61, and extends all around the mouth edge of the base body. In various preferred embodiments, as in the one illustrated, the base body 61 has, up against its mouth edge, a contrast edge 61II against which the gasket 32 is positioned. Once again in a region corresponding to the mouth edge of the body 61, the side walls of the body are, moreover, slightly tapered to facilitate insertion of the mouth edge within the complementary mouth edge of the covering body 63.

A second annular gasket 34 is moreover set between the raised portion 62I of the intermediate body 62 and the inner surface of the covering body 63 that delimits the opening 63". The aforesaid gasket rests on the raised portion 62I and surrounds the series of the connectors, pushbuttons, warning lights, etc., which emerge directly on the outside of the arm. A further gasket 36 is set between the end cover 64 and the bottom 61I of the base body.

In various embodiments, as in the one illustrated, the arm 6 may, moreover, provide a top bellows and a bottom bellows, both designated by the reference 38. The top bellows is constrained at on end to the wall top of the covering body 63 and at its opposite end to the end of the shaft 12 that exits from the aforesaid wall, whereas the bottom bellows is constrained to the end cover 64 and to the end of the shaft 12 that exits therefrom. The inside of both of the bellows is set in communication with the inside of the covering body 63, in particular, the top bellows through the top opening 63A of the body 63, and the bottom bellows through the bottom opening 64A of the end cover 64. The bottom wall 61 of the base body 61 has openings 61" designed to set in communication the inside of the covering body 63 with the inside of the end cover 64. The ends of the bellows are coupled via interposition of gaskets to the respective elements to which they are constrained.

In the light of what has been said above, it will be appreciated that the configuration of the arm 6 thus made guarantees perfect hermetic closing thereof. Again, in various embodiments, as in the one illustrated (see in this connection FIG. 13), the covering body 63 has inside it one or more partition walls 631, which are oriented in a direction transverse to the opposite side walls of the covering, and are designed to overlap partially the front flap 62II of the intermediate body 62 so as to co-operate with this in order to separate the chamber containing the actuation motors from the chamber containing the shaft 12 and the corresponding transmission members 22 and 24. This separation guarantees effective protection of the motors, above all in the cases where the bellows 38 referred to above are absent.

Once again with reference to the configurations of the robot without bellows, within the covering body 63 (shown in dashed lines) a tube 111 made of plastic material, for example PET, may be provided, which can be mounted by being slotted into the top opening 63A of the body 63, for example, by engaging the opening with one end thereof and the cylindrical portion of the member 22, with its opposite end, and which has the function of collecting any water that might infiltrate through the gaps present between the opening 63A and the shaft 12. The tube in question has the bottom closed and is provided with a small draining tube 113 that has the function of draining off the water to the outside, from the bottom side of the arm. In particular, the draining tube 113 is set above one of the openings 61" made in the bottom 61I for discharging the water into the end cover 64, from which it will then flow out by gravity, through the opening 64A of said end cover. In various embodiments, in the configuration without bellows, provided at the openings 61" is a patch 115 having the function of closing the openings except for the one onto which the end of the draining tube 113 gives out. This patch has the function of preventing infiltration of material, for example, water, into the covering body 63 through the aforesaid openings.

In various preferred embodiments, also the other parts of the robot described herein can be appropriately prearranged for use of the robot in the particular applications referred to above.

In this connection, in various preferred embodiments, as in the one illustrated, the first arm 4, which is usually made of metal material and envisages a bottom structure provided with reinforcement ribbings, has a covering plate (not illustrated) applied on the bottom side of the arm and defining on this side a completely smooth surface in order to prevent any deposit of dirt.

Moreover, in various preferred embodiments, as in the one illustrated, also the base structure 2 of the robot, which contains the motor for actuating the first arm and the terminal portions of the equipment of the robot, may be hermetically closed. In particular, the body 18 of the base structure 2 may be closed by the plates 20 and 21 via interposition of appropriate gaskets 47.

Finally, the robot described herein may moreover be equipped with further gaskets 46, 48 in the areas of the portions of mutual coupling of the arms 4 and 6 and of the base structure 2.

It should, in general, be noted that the robot described herein may be provided with appropriate gaskets also in all those parts or elements fixed to the structure of the robot, for example the connector member C, the pushbuttons or warning lights T, the connectors C1, etc., where small slits or gaps could form that would allow passage of air.

What is claimed is:

1. A multi-axial industrial SCARA robot comprising:
   a base structure;
   a first arm pivotally connected to the base structure about a first axis of rotation;
   a second arm pivotally connected to said first arm about a second axis of rotation parallel to said first axis; and
   a head carried by a shaft distal end which is mounted on said second arm;
   a drive connected to the shaft, the drive selectively operable to move the shaft and head in at least one of a first movement of translation along a third axis or in a second movement of rotation about said third axis, said third axis being parallel to said first and second axes;
   wherein said first arm is constituted by at least one first element and one second element, which can be removably fixed together; and
   wherein said first element is pre-arranged for being mounted on said base structure and said second element is pre-arranged for receiving said second arm,
   said robot being characterized in that:
   said base structure further comprises:
      a main body having a first wall and a second wall positioned transverse to said first wall, the main body defining an internal cavity operable to house a motor for actuating said first arm and a plurality of connectors operable to connect equipment of said robot to external supply sources, the first wall and the second wall defining a first opening and a second opening, respectively, in communication with the internal cavity, the main body first or second wall operable to selectively and alternatively be mounted to an external supporting structure;
      a plate having one or more plate connectors operable to be connected to said main body connectors, said plate configured for selective and alternate orientation to one or the other of the first or the second wall that is not connected to the external support structure to close said internal cavity with respect to the outside environment while allowing access for connection of the external supply sources to the one or more plate connectors; and
   at least one of said first and second elements is pre-arranged for being mounted in two different orientations with respect to said base structure and/or to said second arm, where one orientation is upside down with respect to the other operable to maintain the second arm in a normal condition wherein the head is oriented to face in a downward direction regardless of whether the first or the second elements are in the upside down orientation.

2. The robot according to claim 1, wherein said first and second elements have parts of mutual coupling that are configured so as to enable fixing of said first and second elements according to a mutual orientation about an axis transverse to said first, second, and third axes, which selectively envisages a first condition, where said first and second elements have one and the same orientation and a second condition, where said second element is substantially turned upside down with respect to said first element.

3. The robot according to claim 1, wherein said first element has coupling parts to enable assembly of said first element with said base structure, according to an orientation about an axis transverse to said first, second, and third axes wherein in a first condition, said first element and said base structure have one and the same orientation, and alternately a second condition wherein said first element is substantially set upside down with respect to said base structure.

4. The robot according to claim 1, wherein said first arm further comprises an intermediate element, the intermediate element is separate and independent from the first and the second elements, each intermediate element is configured for selective mounting to said first element, and said second element to selectively extend a length of the first arm along a longitudinal axis transverse to the first and the second axis of rotation.

5. The robot according to claim 4 wherein the intermediate element comprises a first intermediate element and a second intermediate element, each of the first and the second intermediate elements are separate and independent of each other and the first and the second elements, the first intermediate element can be mounted with respect to the second intermediate element according to an orientation about an axis transverse to said first, second, and third axes, which selectively envisages a first condition, where said first intermediate element and the second intermediate element have one and the same orientation, and a second condition, where said one of the first or the second intermediate elements is substantially turned upside down with respect to the other of the first or the second intermediate element.

6. The robot according to claim 4 wherein the intermediate element is fixed in position relative to the first and second elements once mounted to the first and the second elements.

7. The robot according to claim 6 wherein the intermediate element further comprising a parallelepipedal configuration comprising:
   substantially planar front side, rear side, and opposite lateral sides; and
   a substantially planar top face connected to the front, rear and lateral sides.

8. The robot according to claim 1, comprising a further plate, which is also configured for selective and alternative orientation to one or other of said first and second walls, totally covering the corresponding first or second opening, wherein in a first condition said plate is associated to said first wall and covers said first opening, and said further plate is associated to said second wall and covers said second opening; and in an alternate second condition said plate is associated to said second wall and covers said second opening, and said further plate is associated to said first wall and covers said first opening.

9. The robot according to any one of claim 1, wherein said main body comprises, on said second wall, an opening for passage of cables and/or pipes of said robot from inside towards the outside of said main body, and wherein said main body has a further opening for passage of said cables and/or pipes, on a wall opposite to said second wall.

10. The robot according to any one of claim 1, wherein said first wall is designed to constitute a rear wall of said base structure, and wherein said second wall is designed to constitute a bottom wall or a top wall of said base structure according to a mode of installation of said base structure.

11. The robot according to claim 1, wherein said base structure is configured for being fixed to the external supporting structure of said robot according to a first orientation and a second orientation, wherein, with respect to said first orientation, in said second orientation said base structure is turned upside down about an axis transverse to said first, second, and third axes.

12. The robot according to claim 1, wherein said second element has coupling parts to enable assembly of said second element with said second arm, according to an orientation about an axis transverse to said first, second, and third axes, wherein in a first condition said second element and said second arm have one and the same orientation and alternatively a second condition wherein said second element is substantially set upside down with respect to said second arm.

13. A multi-axial industrial robot comprising:
a base structure comprising:
  a main body having a rear wall and a bottom wall positioned transverse to the rear wall, the rear wall and the bottom wall defining an interior cavity, the rear wall defining a first opening and the bottom wall defining a second opening in communication with the internal cavity, the main body rear wall and the bottom wall operable to selectively and alternately mount the base structure to an external support structure;
  a plurality of main body connectors positioned in the internal cavity operable to connect equipment of said robot to external supply sources;
  a plate having a plurality of plate connectors operable to selectively connect to the main body connectors, the plate selectively and alternately connected to the rear wall or the bottom wall that is not connected to the external support structure to cover the respective first or second opening while allowing access for connection of the external supply sources to the plurality of plate connectors;
a first arm extending along a longitudinal axis pivotally connected to the base structure about a first axis of rotation, the first arm having a base element connected to the base structure and a distal element;
a second arm pivotally connected to the first arm distal element about a second axis of rotation parallel to said first axis;
a head connected to a shaft mounted on said second arm;
a drive connected to the shaft for selective translation of the head along a third axis and rotation about the third axis, the third axis parallel to the first and the second axes,
wherein one of the first arm base element or the distal element includes a selective and alternative first position and a second position, the second position oriented 180 degrees about the longitudinal axis with respect to the first position operable to maintain the second arm in a normal condition wherein the head is oriented to face in a downward direction regardless of whether the main body top or bottom wall or the rear wall is mounted to the external support structure.

14. The robot of claim 13 wherein the first arm comprises a variable length arm, the variable length arm comprises a separate and independent intermediate element selectively positioned between and connected to the base element and the distal element increasing the length of the first arm along the longitudinal axis, each intermediate element having a selective and alternate fixed first position and a fixed second position relative to the base element, the second position oriented 180 degrees about the longitudinal axis with respect to the first position operable to maintain the second arm wherein the head is facing in the downward direction regardless of whether the main body top or the bottom wall or the rear wall is mounted to the external support structure.

15. The robot of claim 14 wherein the intermediate element comprises one or more modular intermediate elements connected to each other in the selective and alternate fixed first position and fixed first second position operable to selectively extend or decrease the length of the first arm along the longitudinal axis to suit the particular application of use for the robot.

16. The robot of claim 13 further comprising a spacer body connected to the base structure and the base element thereby extending a distance between the base structure and the base element along the first axis.

* * * * *